United States Patent [19]

Ahrweiler

[11] 4,307,501
[45] Dec. 29, 1981

[54] METHOD FOR CONTROLLING THE LINE PRESSURE DISTRIBUTION OF A ROLLER AND CORRESPONDING ROLLER

[75] Inventor: Karl-Heinz Ahrweiler, Krefeld, Fed. Rep. of Germany

[73] Assignee: Eduard Küsters, Krefeld, Fed. Rep. of Germany

[21] Appl. No.: 132,892

[22] Filed: Mar. 24, 1980

[30] Foreign Application Priority Data

Jan. 31, 1980 [DE] Fed. Rep. of Germany ....... 3003395

[51] Int. Cl.³ .......................... B21B 31/32; B60B 9/22
[52] U.S. Cl. ........................... 29/113 AD; 29/116 AD
[58] Field of Search ........ 29/113 AD, 116 R, 116 AD

[56] References Cited

U.S. PATENT DOCUMENTS 3,481,016 12/1969 Cournoyer et al. ...... 29/113 AD X
4,187,594 2/1980 Appenzeller ................... 29/116 AD Primary Examiner—Wayne L. Shedd
Attorney, Agent, or Firm—Kenyon & Kenyon

[57] ABSTRACT

The line pressure distribution of a roller comprising a revolving hollow cylinder forming the working roller circumference, and a stationary cross head which extends lengthwise through the hollow cylinder and leaves space all around from the inside circumference of the hollow cylinder, the roller having longitudinal chambers which are divided off by longitudinal seals which are arranged between the cross head and the inside circumference of the hollow cylinder on both sides of the action plane of the roller and past which the inside circumference of the hollow cylinder slides, at least the chamber situated on the side of the roll gap adapted to be filled with fluid pressure medium, is controlled by establishing zones in at least one of the longitudinal chambers and controllably reducing the pressure in the zones as compared to the pressure prevailing in the longitudinal chamber.

6 Claims, 8 Drawing Figures

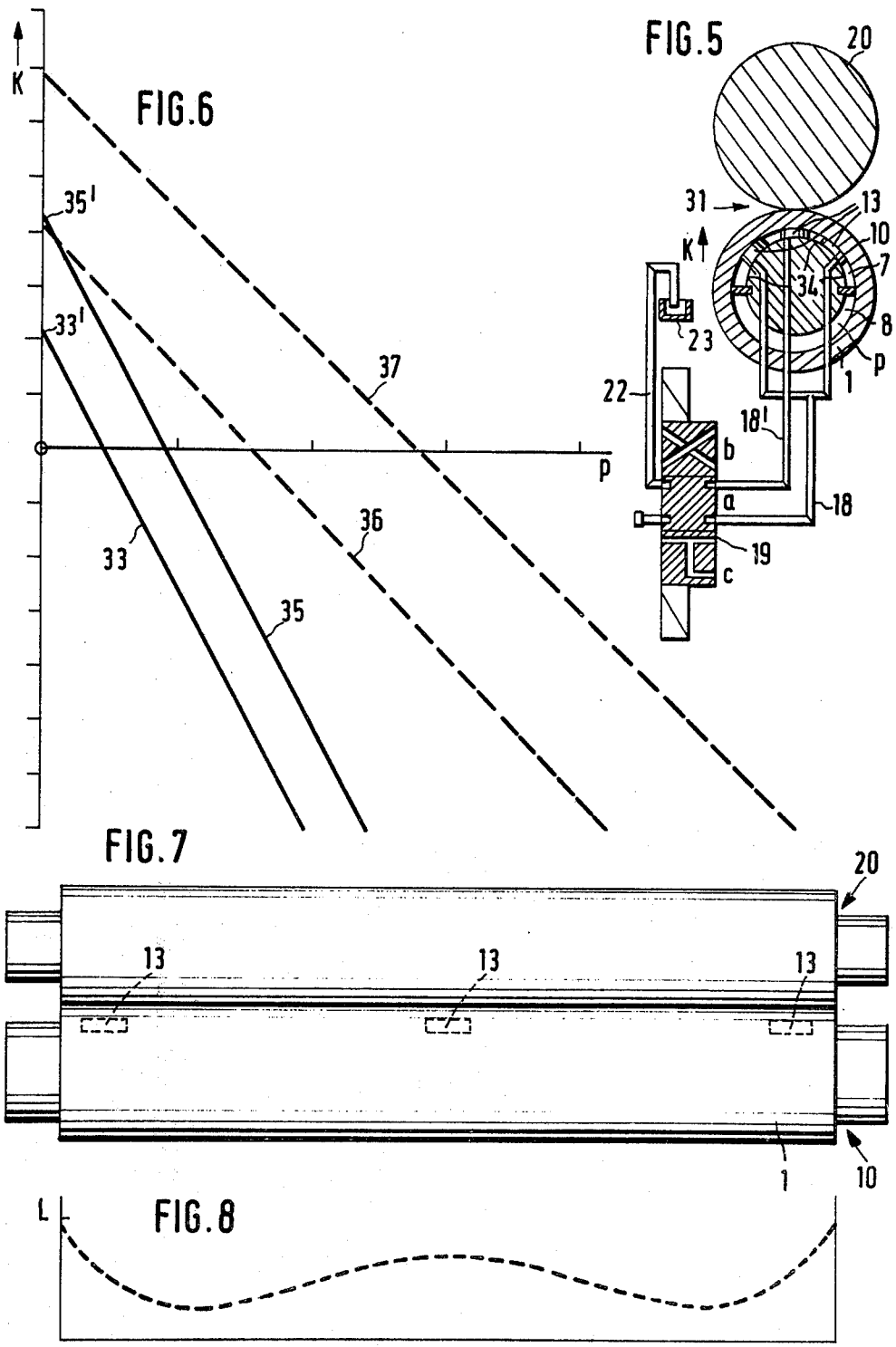

METHOD FOR CONTROLLING THE LINE PRESSURE DISTRIBUTION OF A ROLLER AND CORRESPONDING ROLLER

BACKGROUND OF THE INVENTION

The invention relates rollers in general and more particularly to an improved method and apparatus for controlling line pressure in the type of roller which includes a hollow cylinder revolving about a stationary cross head.

There are quite a number of roller designs with revolving hollow cylinder and stationary cross head, in which the distribution of the line pressure can be controlled to a certain extent. To obtain the distribution of line pressure, these rollers have support elements which are distributed along the interior of the hollow cylinder. The support elements act between the cross head and the hollow cylinder and transmit forces from the cross head to the inside circumference of the hollow cylinder. The support elements are braced against the cross head which is deflected within the hollow cylinder. The support elements, at the same time, supply forces required to generate the line pressure. To bring about differences in the line pressure, the support elements are controlled differently.

In U.S. Pat. No. 3,119,324, piston-cylinder units are lined up along the cross head and act against support shoes which are braced against the inside circumference of the hollow cylinder via an oil film. The pressure fed to the individual piston-cylinder units can be controlled differently. In DE-OS No. 22 30 139, the support shoes have, on the side facing the inside circumference of the hollow cylinder, chambers which are supplied with pressure fluid from the cylinder space of the piston-cylinder units via choke holes, so that the support shoes are supported, at least partially, hydrostatically and the forces are transmitted to the inside circumference via the pressure fluid contained in the chambers.

In DE-PS No. 14 61 066, finally, the cross head contains a longitudinal slot in which several strip-like pistons are accommodated one behind another, which push sliding shoes against the inside circumference of the hollow cylinder. The pressure fluid pressure of the pistons can be controlled separately.

In the above-mentioned embodiments, the line pressure is controlled at support elements which at the same time also provide the overall line pressure. Another roller is described in DE-AS No. 23 32 861. In this roller the hollow cylinder is spaced from the cross head leaving an annular space therebetween which is divided into longitudinal chambers by longitudinal seals disposed between the cross head and the cylinder. One chamber is on the side of the roller gap and the other roller gap is filled with pressure fluid. The pressure in one of the chambers is varied in zones formed therein so that the pressure in the zones differs from that in the rest of the chamber. Thus, part of the line pressure is provided by the pressure fluid contained in the longitudinal chamber. Superimposed on this pressure is the pressure of support elements corresponding to those of the aforementioned DE-OS No. 22 30 139, which are located in the interior of the longitudinal chamber facing the roll gap and which can be controlled separately, so that an additional controlled component is superimposed on the substantially uniform pressure component of the longitudinal chamber.

Here, too, however, the sole thought is to affect the line pressure by influencing a number of discrete, separately controlled support elements which participate simultaneously in the formation of the line pressure.

For controlling the line pressure in this manner, it is necessary to control the entire number of relatively high pressures separately. The individual support elements require these high pressures since they must contribute to providing the line pressure.

If the line pressure distribution is changed and especially, if the entire line pressure level is changed, a large number of high pressures must be readjusted. The precise control of many pressures of that magnitude requires a substantial amount of equipment.

It is thus an object of the present invention to reduce the amount of equipment required for line pressure control in a roller of the type mentioned above.

SUMMARY OF THE INVENTION

According to the present invention, this problem is solved by reducing the pressure in the zones formed in the longitudinal chamber with respect to the pressure prevailing in the longitudinal chamber.

This seemingly simple measure is contradictory to the theory of operation prevailing exclusively in line pressure control heretofore. While heretofore those skilled in the art have always attempted to generate the line pressure distribution by providing correspondingly different forces on the inside circumference of the hollow cylinder, the present invention starts out from an initially uniform pressure and this pressure is reduced point or zone-wise, so that the forces exerted at these points or zones are likewise reduced and in this manner, a variation in the force exertion and thereby, the line pressure distribution, can be applied.

The advantage of the present invention resides in the fact that the reduced pressure can be controlled substantially more easily than the high pressure in the individual support elements of the state of the art. The pressure in the longitudinal chamber alone is not excessively high because of the large active area if a given line pressure is to be generated. Through the reduction, it becomes even smaller and more easily controllable.

It is within the scope of the present invention to maintain pressures above atmospheric pressure in the zones under discussion, or also to apply a vacuum. The preferred embodiment, however, provides that the pressure in the zones is made equal to atmospheric pressure so that control of individual pressures is no longer required at all. The zones established within the longitudinal chamber are brought into communication with the atmosphere of the sump, whereby the overpressure becomes zero automatically. The simplification is particularly striking.

The zones, in which the pressure is reduced, are determined geometrically. This results, with constant pressure in the longitudinal chamber, in a certain force distribution on the inside circumference of the hollow cylinder and therefore, also only in a certain line pressure distribution, which in itself would allow only a rough adaptation to a specified line pressure curve.

Surprisingly, it has been found, however, that the present invention allows a continuous matching of the line pressure distribution by means of an easily implemented embodiment.

It is known in rollers of the type under discussion, in which the pressure is exerted exclusively by pressure fluid contained in longitudinal chambers between the cross head and the inside circumference of the hollow cylinder, to fill the chamber facing the roll gap as well as the longitudinal chamber facing away from the roll gap with pressure fluid. Without special measures, filling of the chamber facing away from the gap cannot be completely avoided, since naturally, a certain small percentage of the pressure fluid passes under the seals of the longitudinal chamber facing the roll gap into the longitudinal chamber remote from the roll gap and by and by fills the latter. Therefore, an outlet for this pressure fluid must be provided in any case; this pressure fluid already generates a certain amount of counterpressure because of its flow resistance if the longitudinal chamber facing away from the roll gap becomes filled with pressure fluid. In known embodiments, this counterpressure, however, is intentionally set to a certain level in order to generate a defined and easily controllable pressure difference.

In accordance with one embodiment of the invention, a controlled pressure is also maintained in the chamber facing away from the gap and the line pressure is determined by the pressure difference between the two chambers. In order to reduce the effect of the lower pressures in the zones, the roller is operated with lower absolute pressures in the longitudinal chambers and for increasing the effect of the zones is operated with higher absolute pressures in the longitudinal chambers, while maintaining a constant differential pressure.

It then turns out that with a high pressure level and a given pressure difference, the influence of the zones for a given assumed line pressure is larger than for a lower pressure level. If therefore only a small correction of the line pressure is necessary, the desired pressure difference need be established only at a low pressure level.

This is due to the fact that the pressure in the longitudinal chamber which has the pressure reduction or pressure relief in specified zones, is not lowered over its entire extent but only in certain subregions thereof. To explain the effect which is obtained, a section of a roller limited in the lengthwise direction will be considered, in which one of the zones is located on the side facing the roll gap. The opposite longitudinal chamber, of course, contains no zone. In the region corresponding to the zone, in the longitudinal chamber facing the roll gap, the hydraulic pressure prevailing in the longitudinal chamber facing away from the roll gap is thus active. Opposite this region on the other side is the pressure of the zone, which is possibly reduced to zero. A difference therefore remains which acts against the inside circumference of the hollow cylinder on the side away from the roll gap and there tends to pull hollow cylinder away from the roll gap if the pressure in the longitudinal chamber facing away from the roll gap is high enough.

In the adjacent lengthwise regions of the roller, which contain no zones, the force relationships depend on the pressure level; there, only the pressure difference matters, which can always be set to be the same for pressures of different magnitude in the two longitudinal chambers. However, the higher the pressure in the longitudinal chamber away from the roll gap, the stronger is the effect obtained by the existence of the zones in the longitudinal regions of the roller containing them, and the more strongly is the roller relieved in these longitudinal regions. It is important in this connection that only two relatively low pressures need be controlled for controlling the correction influence, namely, the pressures in the two longitudinal chambers, while in rollers according to the state of the art, a multiplicity of high pressures must be controlled independently of each other.

In accordance with the illustrated embodiment, the zones are divided off by means of ring shaped sealing elements attached to the cross head. The ring shaped sealing elements rest against the inside of the hollow cylinder and have within them a pressure different from that in the longitudinal chamber in which they are located. The inside of each sealing element is in communication with a feed line in the cross head with means, i.e., a valve, provided to shut off the feed line when desired. Alternatively, a controllable choke is disposed in the feed line. The valve or choke connects the feed line to a pressure lower than that prevailing in the longitudinal chamber.

Furthermore, as disclosed, the region of low pressure, to which the zones can be connected, is preferably the pressure medium supply tank, so that the pressure adjusted in the zones is atmospheric pressure.

In accordance with a specific embodiment, the sealing elements are formed by rings, i.e., to be sections, which are guided in a sealed manner in cylindrical radial recesses in the cross head. The feed lines open directly into the rings, which have their end faces resting directly and tightly against the inner circumference of the hollow cylinder under a spring force.

The close contact of the tube sections, of course, is not understood to mean a hermetic seal. Rather a slight amount of passage of pressure medium into the interior of the tube sections will always occur at the tube sections when the hollow cylinder revolves as well as at the longitudinal seals. At the inside circumference of the hollow cylinder, a film of pressure medium is formed, which is carried along to a certain degree under the end face of the tube section. If the feed line is shut off, the interior of the tube section becomes filled with the pressure medium relatively fast, and a pressure is built up which corresponds to the pressure in the surrounding longitudinal chamber. In this condition, the zones formed by the tube sections also participate in exerting the pressure on the inside circumference of the hollow cylinder, i.e., it is as if the zones do not exist. If, however, the connecting line is opened, any pressure medium passing into the interior of the tube section can flow off immediately without the possibility of a pressure build up occurring due to the lack of a choke. The expression "lack of a choke" should naturally be understood in a practical sense: any line has a certain amount of choke action per se. This, however, is not meant here. Rather, there should be no pronounced constrictions in the feed line which lead to an appreciable pressure build up as the quantities of liquid in question here flow through. If the feed line is in the open condition, no pressure is exerted in the zones formed by the tube sections; rather, the desired targeted non-uniformity of the pressure exertion in the longitudinal chamber comes about.

The arrangement of the zones depends on the desired influence on the line pressure distribution. The application of the zones is therefore not limited only to the longitudinal chamber facing the roll gap but can also be made in the longitudinal chamber facing away from the roll gap. The distribution of the zones along the roller depends on the requirements of the line pressure influence.

In one preferred embodiment, however, zones of reduced pressure are provided in the longitudinal chamber facing the roll gap in the middle and at the ends of the roller.

This embodiment is suitable particularly for those cases where the line pressure distribution is the so-called W-line and acts to mitigate this under deviation from uniform line pressure distribution.

BRIEF DRAWINGS OF THE DRAWINGS

FIG. 5 is a schematic cross section corresponding to FIG. 3 with the control of the zones indicated.

FIG. 6 is a diagram of the mode of operation of the zones.

FIG. 7 is a schematic view of a pair of rollers corresponding to FIG. 1 in which the roller according to the present invention is the lower roller.

FIG. 8 is a diagram of the line pressure distribution, the so-called W-line.

DETAILED DESCRIPTION OF THE INVENTION

Figure 1:
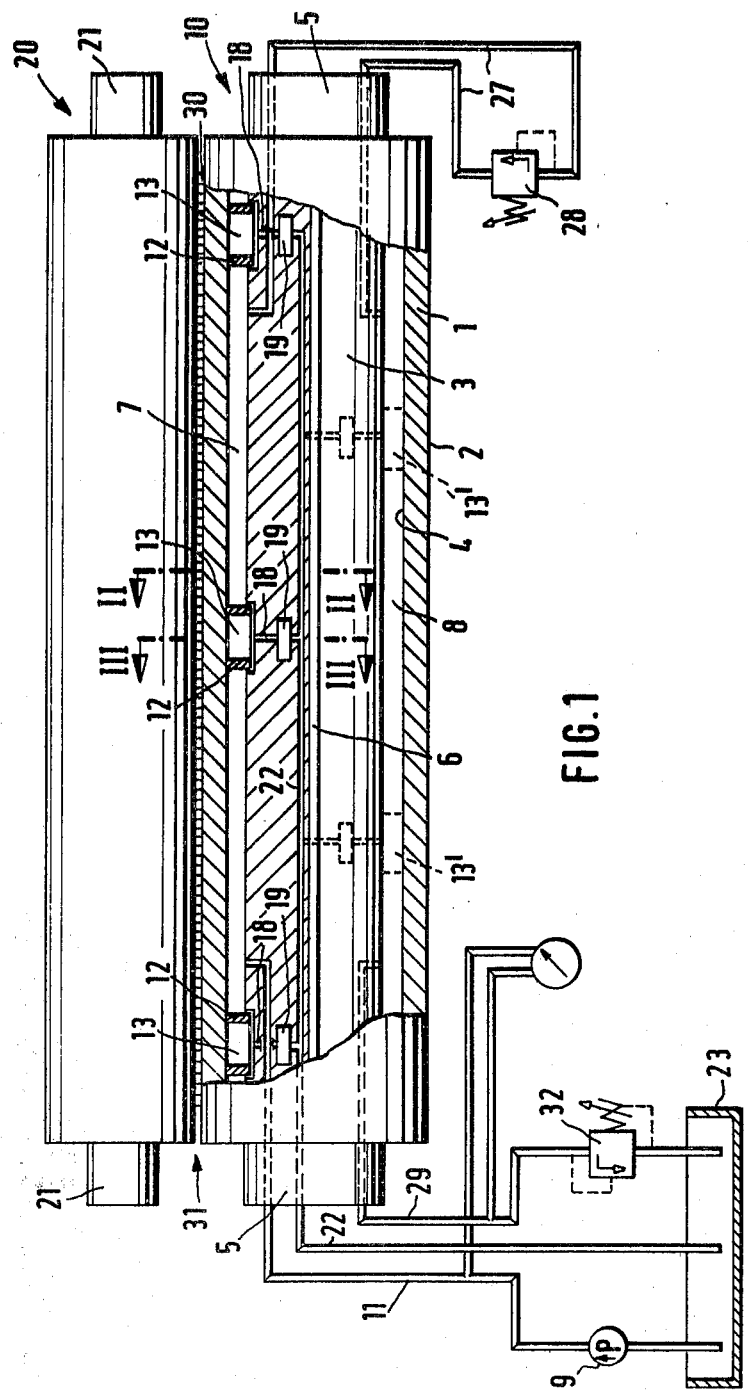
FIG. 1 is a schematic view of a pair of rollers, the lower roller of which is constructed in accordance with the present invention.

The roller arrangement shown in FIG. 1 comprises a lower roller 10 and an upper roller 20, between which a web of material 30 is subjected to a pressure treatment in a roll gap 31. The upper roller is a conventional solid roller. The lower roller, on the other hand, comprises a revolving hollow cylinder 1, the outer circumference of which constitutes the working roller circumference and through which a stationary cross head 3 extends lengthwise, leaving an annular space from the inside circumference 4 of the hollow cylinder 1, so that it can bend within the hollow cylinder 1 without touching the inside circumference 4.

The journals 21 of the upper roller 20 as well as the ends 5 of the cross head 3 protruding from the hollow cylinder 1 at the ends are supported in a roll stand and are pressed together by suitable loading devices, not shown.

In the space between the inside circumference 4 of the hollow cylinder 1 and the cross head 3, longitudinal chambers are divided off by longitudinal seals 6 which are arranged at the cross head 3 and extend along the cross head 3 on both sides thereof, as well as by suitable transverse seals which are arranged at the ends of the hollow cylinder 1 but are not shown; the longitudinal chamber located on the side of the roll gap has the reference numeral 7, and the longitudinal chamber located on the opposite side, the reference numeral 8. The longitudinal chamber 7 is filled via the line 11 with pressure fluid by means of a pump 9. The resulting hydraulic pressure acts uniformly on the inside circumference 4 of the hollow cylinder 1 on the side of the roll gap and provides the required line pressure. On the other side, the pressure fluid is braced against the cross head 3 which is defelected under this load. In this manner, a uniform pressure can be exerted on the hollow cylinder from the inside without thereby stressing the hollow cylinder in flexure. Instead, the bending is taken over by the cross head 3 which leaves the hollow cylinder uninfluenced. The hollow cylinder 1 can, of course, actually be bent, following the deflection of the counter-roller. This, however, is not a deflection under the action of the line pressure exerted on the hollow cylinder 1.

The pressure exerted against the inside circumference 4 of the hollow cylinder 1 in the longitudinal chamber 17 is now of necessity uniform over the lengthwise extent of the longitudinal chamber 7. Under certain conditions it may be desirable to modify this uniform exertion of the pressure at certain points. To this end, zones 13 are established in the longitudinal chamber 7 by means of rings 12 according to FIG. 1. The zones are separated from the longitudinal chamber 7 in the sense of being capable of being supplied with a different pressure.

Figure 2:
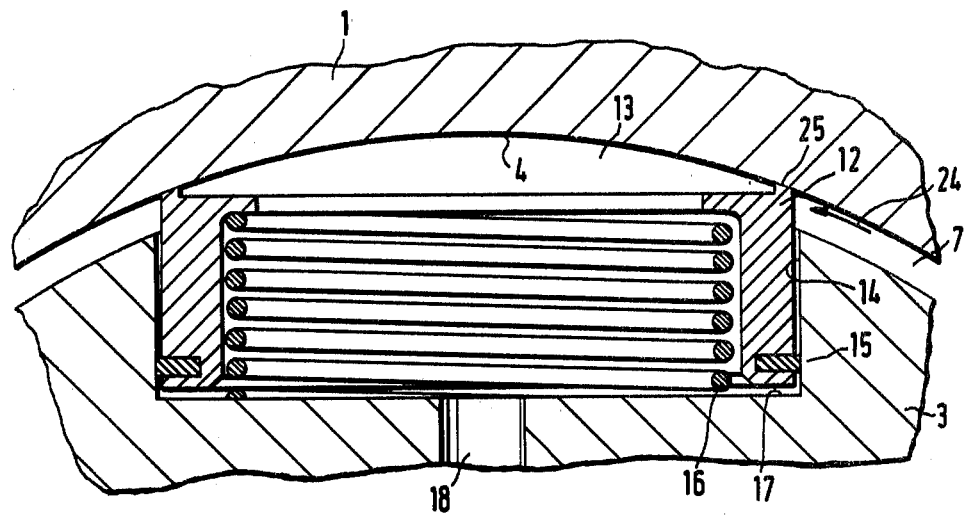
FIG. 2 is a partial cross section through an individual zone formed by a ring.

The detailed design of the rings can be seen in FIG. 2. The end 25 of the rings 12 facing the inside circumference 4 of the hollow cylinder 1 are shaped in accordance with the shape of the inside circumference 4 and touch the latter tightly. At their rear end, the rings 12 are accommodated in corresponding cylindrical recesses 14 of the cross head 3 and are sealed from the inside wall of the recess 14 by seals 15 extending over their circumference. The rings 12 are further acted upon by a spring 16 which is braced against the bottom 17 of the recess and an inner shoulder 18 of the ring 12 and holds the ring 12 in contact with the inside circumference 4 of the hollow cylinder 1.

A feed line 18 which is in communication via a valve 19 with a line 22 which leads to the supply tank 23 at atmospheric pressure, leads to the recess 14 and thereby into the zone 13 defined by the interior of the ring 12. Such a line 18 with a valve 19 is associated with each zone 13 or each ring 12, respectively. The valve 19 can shut off or open the line as desired. The cross sections are chosen large, so that pressure fluid from the zone 13 can flow off into the supply tank practically without any choke effect in the lines, i.e., without building up pressure.

In the illustrated embodiment, the rings and the recesses 14 have a circular cross section with an axis which is perpendicular to the roller axis in the action plane. However, other shapes can also be considered, for instance, elongated designs extending in the circumferential direction. The extent of the zones 13 in the lengthwise roller direction should only be a fraction of the roller length, since the zones are to exert only a local correction of the pressure distribution.

The function of the rings 12 is as follows. If, for instance, the hollow cylinder 1 revolves according to FIG. 2 in the direction of the arrow, it slides along the end face 25 of the ring 12. The longitudinal chamber 7 is filled with pressure fluid which forms a film at the inside circumference 4 of the hollow cylinder 1. With the relatively high relative velocity of the inside circumference against the end face 25, the film is carried along at least in part under the latter into the interior of the zone 13. At the edge of the ring opposite in the sense of the arrow, part of the pressure fluid is wiped off, so that pressure fluid accumulates in the zone 13 as the hollow cylinder 1 rotates. If the valve 19 is now closed, a pressure builds up in the zone 13 which substantially corresponds to the pressure in the longitudinal chamber 7. This pressure build up occurs relatively quickly since, in general, the zone 13 and the feed line 18 are already filled with pressure fluid anyhow. When the pressure in the zone 13 has assumed the value of the pressure in the longitudinal chamber 7, the existence of the zone is practically not noticeable. The line pressure distribution given by the pressure fluid in the longitudinal chamber 7 is not influenced at all or only very little. If, however, the valve 19 is opened, the pressure liquid entering the zone 13 can flow off into the supply tank 23 without choke effect, and no pressure is built up in the zone 13. The zone 13 is then set apart from the otherwise uniform pressure exertion given by the pressure fluid in the longitudinal chamber 7. At that point, pressure is taken away and the line pressure distribution in the roll gap 31 is influenced accordingly. The zones 13 are shown in FIG. 1 in the longitudinal chamber 7. While this is the embodiment considered in most cases, it is in principle also possible to arrange zones with reduced pressure in the opposite longitudinal chamber 8 which is indicated by the dashed zones 13' which can be provided instead of, or together with, the zones 13 in the longitudinal chamber 7.

Figure 3:
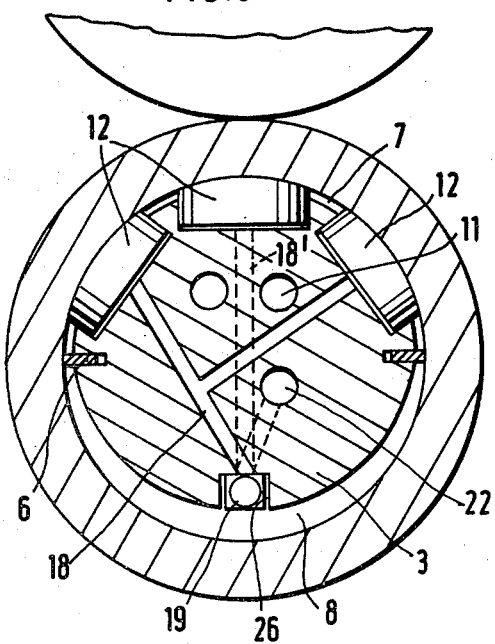
FIG. 3 is a partial cross section through the lower roller in FIG. 1 along the line III—III.
Figure 4:
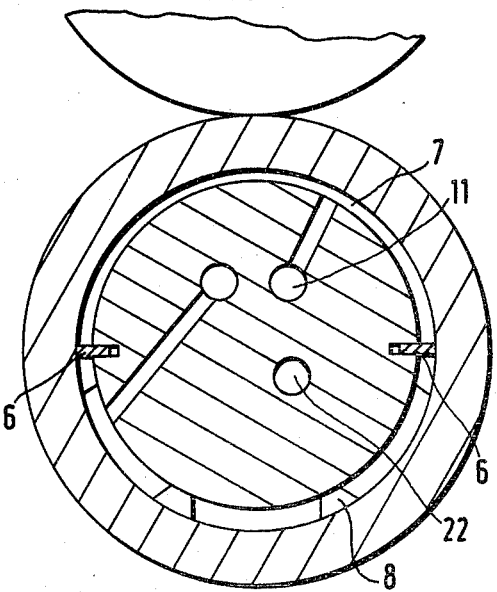
FIG. 4 is corresponding cross section along the line IV—IV.

In FIG. 1, only three single zones, each defined by a ring 12, are shown in the action plane of the roller 10, i.e., in the plane connecting the axes of the rollers 10 and 20. To refine the influencing of the line pressure, three rings 12 are provided at each location, according to FIG. 3, at the same height, i.e., in the same length range of the roller 10, which can be controlled separately and make a variation of the pressure relief at the respective point possible. In the illustrated embodiment, the two outer rings 12 are connected via a common input line 18 to a valve 19 which is arranged in a recess of the cross head 3 in the longitudinal chamber. The middle ring 12 is connected via an input line 18' situated below the plane of the drawing to a valve which is located behind the valve 19 but is not shown. The valve 19 connects the input line 18 to the return line 22. The valve located behind connects the input 18' to the return line 22. Thus, either the two outer rings 12 or all three rings can be pressure relieved as desired. The valves 19 are implemented as magnetic valves which are readily accessible in the recess 26 and need only a small cross section for the electrical leads. The presentation of the valves 19 in FIG. 1 is, of course, only schematic.

In the embodiment described so far, only a step-wise influence on the line pressure is possible. The zones 13 are either shut off or connected to the supply tank 23, so that a fixed amount of pressure either is there or not. However, it is also possible to make the arrangement so that a continuous variation of the line pressure influence obtained by the individual zones 13 can be brought about.

Normally, pressure fluid is fed via the pump 9 and the line 11 only to the longitudinal chamber 7 which faces the roll gap 31. At the longitudinal seals 6, pressure fluid naturally passes into the longitudinal chamber 8 and is, as customary, returned to the supply tank.

In the embodiment according to FIG. 1, however, a bypass line 27, which contains a difference pressure valve 28, is provided between the longitudinal chambers 7 and 8. A certain portion of the pressure fluid in the longitudinal chamber 7 therefore flows continuously into the longitudinal chamber 8 and from the latter, via the line 29 and the pressure setting valve 32, into the supply tank 23. The longitudinal chamber 8 is therefore not kept at zero pressure, but a defined pressure is generated therein which is lower than the pressure in the longitudinal chamber 7 by an amount given by the setting of the valve 28. The line pressure is therefore determined no longer by the absolute pressure in the longitudinal chamber 7, but by the pressure difference between the longitudinal 7 and 8. The same line pressure can therefore be generated with a low pressures in the two longitudinal chamber 7 and 8, and also with a high pressure level, i.e., with high pressures in the longitudinal chambers 7 and 8. With conditions which are uniform over the length of the longitudinal chambers 7 and 8, the pressure level does not appear to the outside.

The pressure level, however, does play a part concerning the degree of influence on the line pressure distribution through the presence of the pressure free zones 13.

In FIG. 5, the actuation of three zones 13 distributed over the circumference in the longitudinal chamber 7 is shown schematically once more. In position a, all three zones 13 are shut off and are practically not noticed. In position b of the valve 19, the two outer zones 13 are without pressure, while the middle zone 12 is shut off. In position c, finally, all three zones 13 are without pressure and reduce, in the broad region corresponding thereto, the forces exerted on the inside circumference of the hollow cylinder 1.

FIG. 6 shows schematically the resulting force K exerted on the inside circumference of the hollow cylinder 1 in the length region corresponding to the zones 13 as a function of the pressure P in the longitudinal chamber 8. Curve 33 will be considered first, which corresponds to a line pressure of about 50 kg/cm which would occur in the cylinder if no influence by the zones 13 were taking place. Then, all three zones 13 are activated in accordance with FIG. 5, i.e., made pressure free. With P=0, i.e., no pressure in the longitudinal chamber 8, a positive amount of force (i.e., directed toward the roll gap 31) is then obtained for the configuration shown in FIG. 5, because the lengthwise extent of the zones 13 does not cover the entire circumference of the longitudinal chamber 7 and therefore, pressure is exerted also in the lengthwise region of the zones 13 by the regions 34 remaining between them, which has the pressure of the longitudinal chamber 7 and drives the hollow cylinder 1 against the roller 20 at this point.

However, the force K drops if the pressure P in the longitudinal chamber 8 is increased. To keep the line pressure at the desired value, the pressure in the longitudinal chamber 7 must also be increased, of course. Since, however, opposite zones are located in mirror symmetry fashion opposite the zones 13 in the longitudinal chamber 7 in which there is no pressure, in which zones the increased pressure P is now noticed, there appear, if the the pressure P is increased, components which counteract the initial valve 33' of the force K and which reduce the force K, directed toward the roll gap 31, of the lengthwise region corresponding to the zones 13 and finally even make it negative, so that the hollow cylinder 1 is pulled away from the roll gap 31 in the length region corresponding to the zones 13 if the pressure P is increased correspondingly.

Merely by selecting the pressure level while maintaining the line pressure, the influence of the zones 13 can therefore be decreased continuously from zero, i.e., from where the pressure prevailing in the longitudinal chamber 7, also prevails in the zones 13, and can even be changed into force components pointing away from the roll gap.

Curve 35 shows the same situation if one starts out with a line pressure of 100 kg/cm which is to be maintained.

The initial force 35' appearing with the longitudinal chamber 8 free of pressure is then, of course, twice as large as the initial force 33'. Curve 36 applies to a line pressure of 50 kg/cm if only the two outer zones 13 are connected, according to FIG. 5, to the supply tank 23 via the line 18. The slope of this curve is less because the pressure free portion in the longitudinal chamber and thereby also the influence of the regions which are oppositely situated with mirror symmetry and carry the pressure P, in the longitudinal chamber 8 is less. Curve 37 shows the course with the same configuration and a line pressure of 100 kg/cm.

To illustrate the significance of the invention, a frequently encountered application is illustrated in FIGS. 7 and 8, which corresponds to FIG. 1 and in which the upper roller 20 is a conventional solid roll and the lower roller 10 a cylinder with three pressure relieved zones 13 which are formed by rings 12 and are arranged on the side of the roll gap. The case will be considered first where the zones 13 are not active. In such a case, practice shows (and it can also be proven theoretically) that a uniform line pressure distribution does not develop in the lower roller 10, which is designed as a floating roller, over the width, i.e., along the roll gap, even though the pressure is exerted uniformly. This is explained by the different bending lines of the hollow cylinder 1 and the solid roller 20. FIG. 8 shows the distribution of the line pressure L over the length of the roll gap of the two rollers 10 and 20 shown above it. The line pressure curve was obtained via a calculation of the deviation of the bending lines of the rollers 10 and 20 from each other by means of the method of finite elements. The shape of this deviation along the roll gap leads approximately to the shape of the line pressure. The result is a so-called W-line, i.e., a line pressure distribution which has higher values in the middle and at the two ends than in the regions in between.

To make the generation of this curve plausible, it is advisable to start with the adjustment process of the two rollers. The lower roller 10, due to its properties, can be set straight. The upper roller sags in the middle under its weight. Therefore, contact is made first in the middle when the rollers are set. The line pressure is therefore initially higher in the middle than at the edges. If the roller journals are then brought closer together, the two rollers make contact with each other on their entire length, but the increase of the line pressure in the middle is preserved. If the pressure is increased, the contact takes place preferably at the ends because the latter can give way least in the conventional roller 20. Toward the middle, the line pressure declines because the roller 20 is bent away upwards. Together with the line pressure increase in the middle due to the weight, the distribution reproduced in FIG. 8 is then obtained.

If reduced pressure zones 13 are now provided at the locations indicated, some of the force exerted by the pressure fluid in the chamber 7 is taken away. This naturally lowers the pressure at these points and in their surroundings. The arrangement of the zones 13 in FIG. 7 corresponding to the points of maximum line pressure are depressed thereby so that the heavy deviation from a uniform line pressure distribution seen in FIG. 8 can be equalized or, in favorable cases, practically made to disappear.

What is claimed is:

1. A method for controlling the line pressure distribution or a roller comprising a revolving hollow cylinder forming the working roller circumference, and a stationary cross head which extends lengthwise through the hollow cylinder and leaves space all around from the inside circumference of the hollow cylinder, said roller having longitudinal chambers which are divided off by longitudinal seals which are arranged between the cross head and the inside circumference of the hollow cylinder on both sides of the action plane of the roller and past which the inside circumference of the hollow cylinder slides, at least the chamber situated on the side of the roll gap adapted to be filled with fluid pressure medium, comprising establishing zones in at least one of the longitudinal chambers and controllably reducing the pressure in said zones as compared to the pressure prevailing in the longitudinal chamber.

2. The method according to claim 1, wherein a controlled pressure is also maintained in the longitudinal chamber facing away from the roll gap and the line pressure is determined by the pressure difference in the two longitudinal chambers, and further including, for reducing the effect of the pressure reduction in said zones, operating said roller with lower absolute pressure in the longitudinal chambers and for increasing the effect of the pressure reduction in said zones, operating said roller with higher absolute pressure, the pressure difference being maintained the same.

3. In a roller comprising a revolving hollow cylinder forming the working roller circumference, and a stationary cross head which extends lengthwise through the hollow cylinder and leaves space all around from the inside circumference of the hollow cylinder, said roller having longitudinal chambers which are divided off by longitudinal seals which are arranged between the cross head and the inside circumference of the hollow cylinder on both sides of the action plane of the roller and past which the inside circumference of the hollow cylinder slides, at least the chamber situated on the side of the roll gap adapted to be filled with fluid pressure medium, the improvement comprising:
    (a) ring-shaped sealing elements disposed in one of the longitudinal chambers, said elements attached to the cross head and resting against the inside circumference of said hollow cylinder forming zones in said chamber with a pressure different from the longitudinal chamber;
    (b) feed lines arranged in the cross head opening into said sealing elements; and
    (c) controllable valves for coupling said feed lines to a region of pressure lower than the longitudinal chamber.

4. The improvement according to claim 3, wherein the pressure fluid supply tank for the roller is the region of lower pressure.

5. The improvement according to claim 4, wherein said sealing elements are formed by rings which are guided in a sealed manner in cylindrical radial recesses in the cross head, into which recesses said feed lines open, with the end faces of said rings resting directly and tightly against the inside circumference of the hollow cylinder and means for acting against said rings with a spring force.

6. The improvement according to claim 3, 4 or 5 wherein zones of reduced pressure are provided in the longitudinal chamber facing the roll gap in the middle and at the ends of the roller.

* * * * *